United States Patent [19]

Marshall et al.

[11] 3,866,465
[45] Feb. 18, 1975

[54] TIRE FORCE VARIATION MACHINE

[75] Inventors: Richard P. Marshall, Tallmadge;
James E. Rice, Cuyahoga Falls;
James D. Stokes, Akron, all of Ohio

[73] Assignee: The Goodyear Tire & Rubber Company, Akron, Ohio

[22] Filed: Jan. 14, 1974

[21] Appl. No.: 432,931

[52] U.S. Cl. .................................................. 73/146
[51] Int. Cl. .......................................... G01m 17/02
[58] Field of Search ................................. 73/146, 8

[56] References Cited
UNITED STATES PATENTS

| | | | |
|---|---|---|---|
| 3,543,576 | 12/1970 | Bishop | 73/146 |
| 3,656,343 | 4/1972 | Braden et al. | 73/146 |

*Primary Examiner*—Donald O. Woodiel
*Attorney, Agent, or Firm*—F. W. Brunner; R. S. Washburn

[57] ABSTRACT

Apparatus for measuring force variations of vehicle tires including a shaft-mounted cylindrical load wheel which is movable to impress a predetermined base load on a rotatably mounted tire and be deflected in response to the variations from such base load due to radial, lateral and/or other force variations in the tire. The load wheel shaft is fixed on a carriage slidable on a frame for movement by driving means toward and away from the tire which is rotatable about an axis fixed relative to the frame. Mechanism is constructed and arranged to secure the carriage rigidly with respect to the frame during the force variation measurement so as to isolate the driving means and/or prevent unwanted movements of the carriage relative to the frame from variations in force exerted by the rotating tire after the base load has been applied.

The foregoing abstract is not to be taken as limiting the invention of this application, and in order to understand the full nature and extent of the technical disclosure of this application, reference must be made to the accompanying drawing and the following detailed description.

6 Claims, 4 Drawing Figures

PATENTED FEB 18 1975
3,866,465
SHEET 2 OF 2
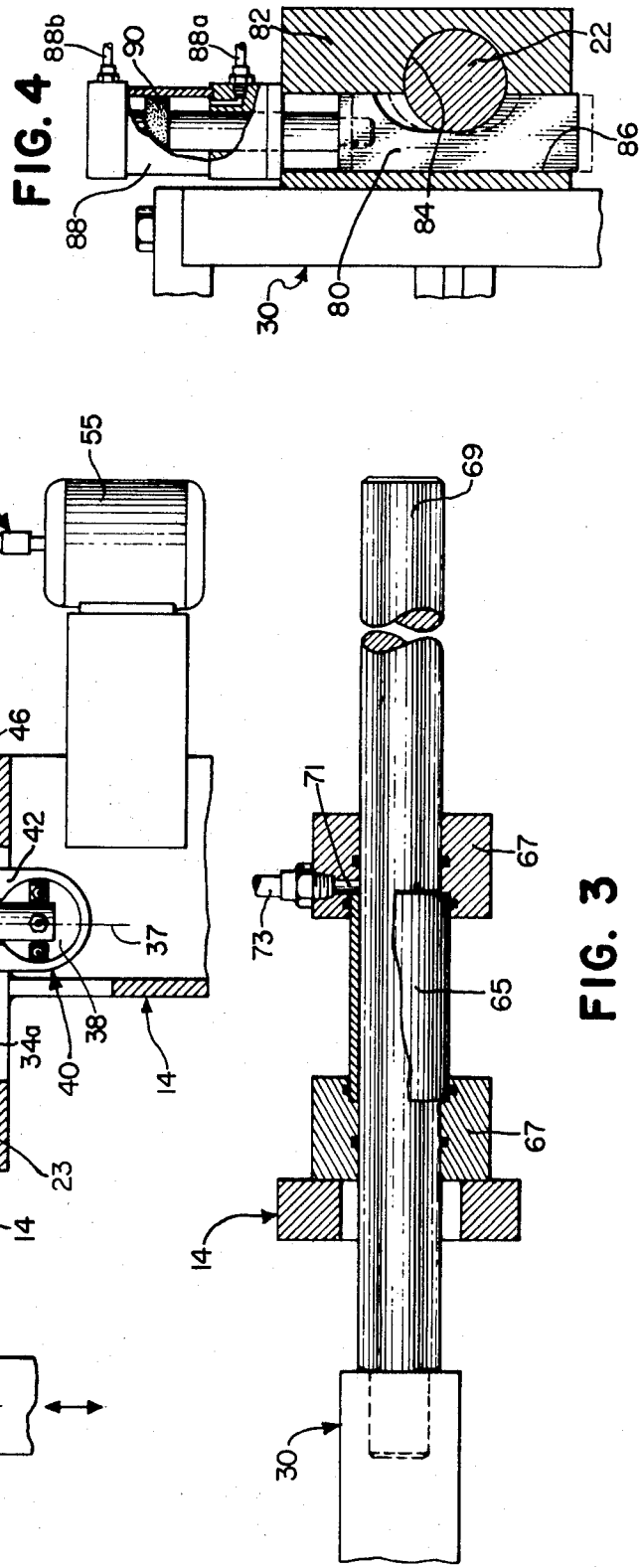
FIG. 4
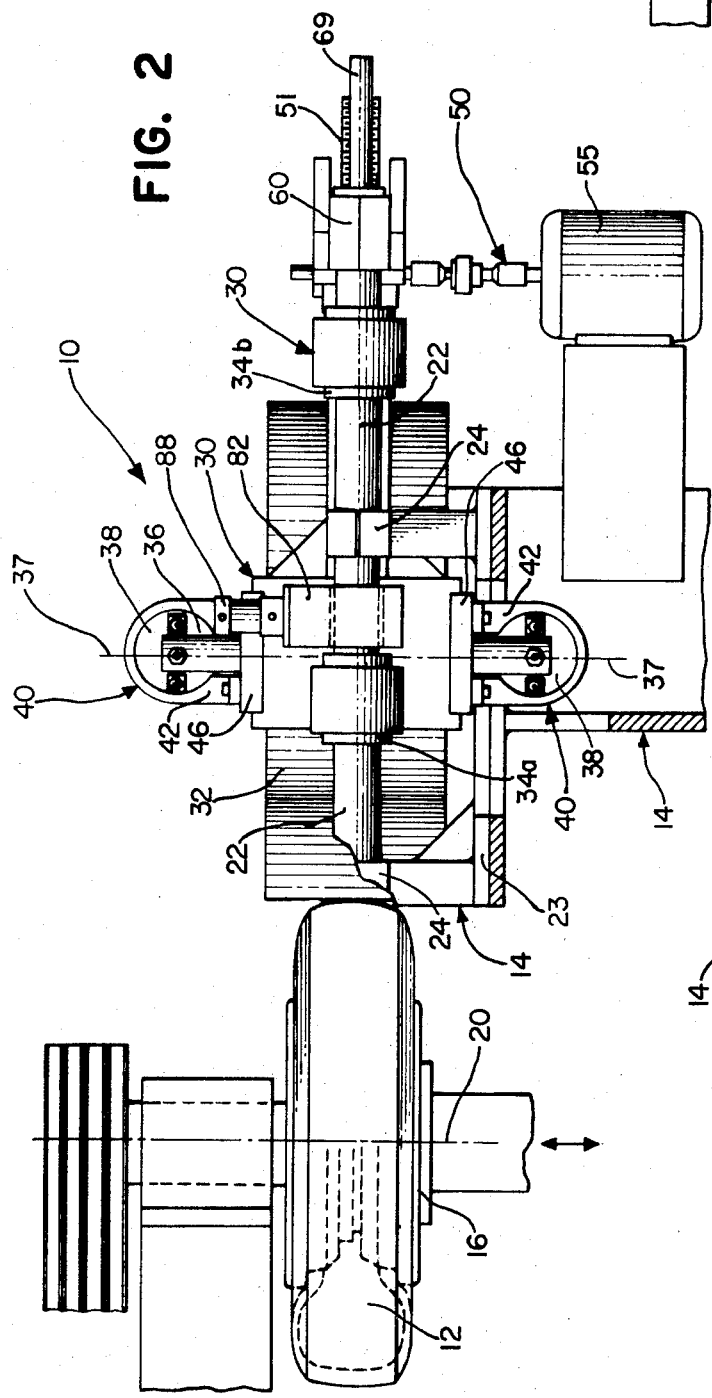
FIG. 2
FIG. 3

TIRE FORCE VARIATION MACHINE

BACKGROUND OF THE INVENTION

The present invention relates to apparatus for measuring force variations in tires. More particularly the invention provides an improvement in force variation apparatus such as apparatus of the character described in U.S. Pat. No. 3,656,343.

The object of the invention is the provision of improved apparatus for measuring force variation in tires.

By way of illustration, preferred embodiments of the invention are described hereinafter in connection with the attached drawings in which:

FIG. 2 is an elevation view of the apparatus of FIG. 1;

FIG. 3 is an enlarged detail view taken on line 3—3 of the apparatus of FIG. 1; and FIG. 4 is an enlarged detail view taken on line 4—4 of the apparatus of FIG. 1.

Figure 1:
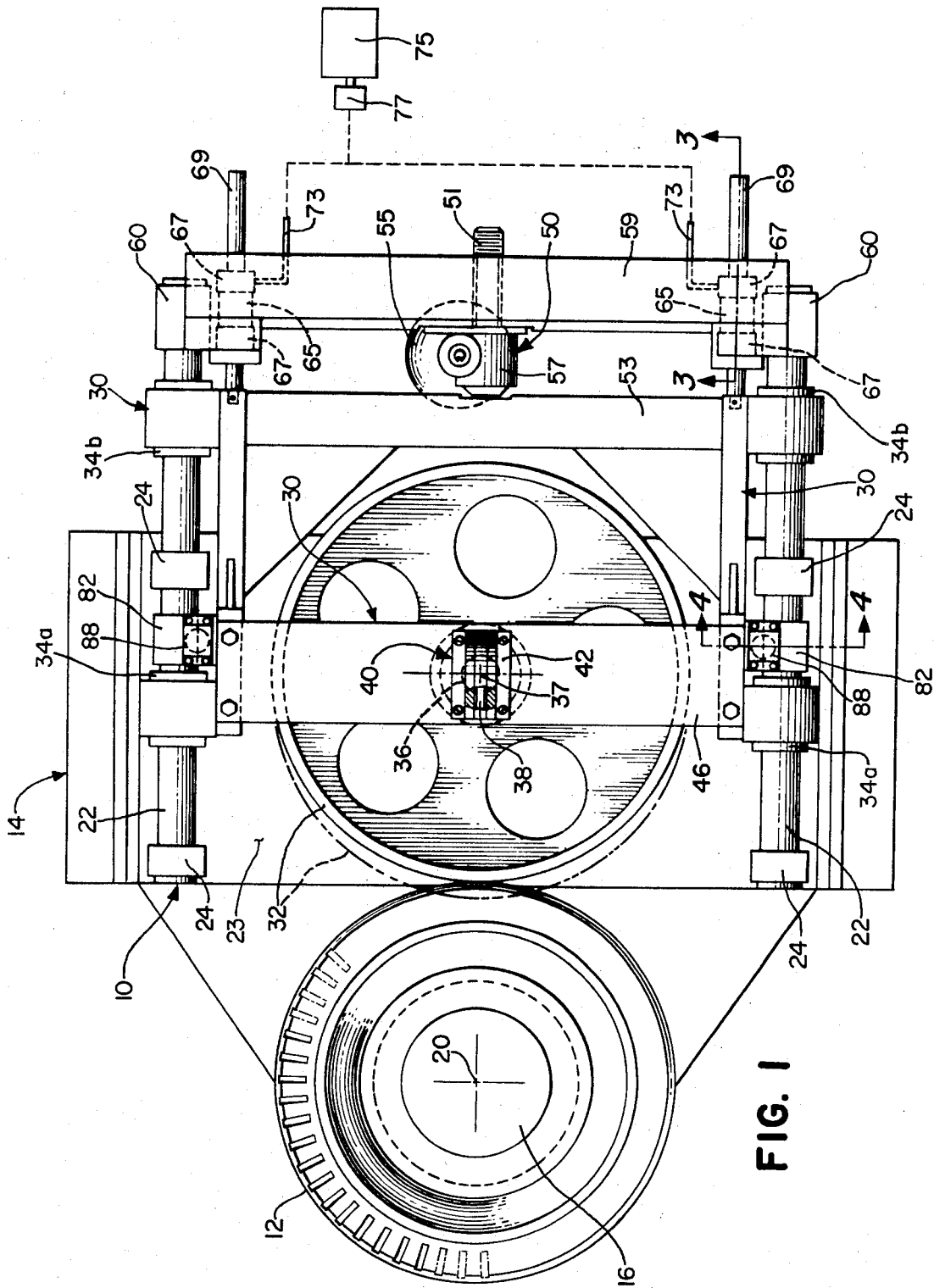
FIG. 1 is a plan view of force variation apparatus embodying the invention.

Referring to the drawings, and particularly to FIGS. 1 and 2, the apparatus 10 for measuring force variation in a tire 12 comprises a main frame 14, means 16 secured to the frame for mounting and dismounting a tire to be tested and for rotating the tire about an axis 20 fixed in relation to the frame 14. The specific structure of the tire mounting and rotating means 16 is not a part of this invention and is, therefore, not shown or described in detail.

A parallel pair of cylindrical bars 22 are anchored securely on a plate 23 which forms a part of the frame 14 so as to be an integral part thereof, each by two split and screw clamped, bearer blocks 24 so that the bars form slide means on which the carriage 30 can be moved along a fixed path, which is preferably perpendicular to the axis 20, toward and away from the tire.

The carriage 30, on which the load wheel 32 is mounted, is a rigid box structure provided with slide bearings 34a, 34b of the ball bushing type which slidably engage the slide bars 22 enabling the carriage 30 to be moved toward and away from the tire 12 to carry the cylindrical load wheel 32 forward to engage and load the tire and rearward to disengage the tire. The carriage is more resistant to deflection by the force variations exerted on the load wheel by a tire than are the load cell means presently to be discussed. The difference in stiffness should be such that deflections other than in the load cell means can be ignored.

The load wheel 32 is mounted on conventional bearings for rotation about a fixed vertical shaft 36 and coaxially of an axis 37 parallel to the tire 20. The upper and lower ends of the load wheel shaft 36 are provided with end adapters rigidly secured respectively to deflectable force transducer elements 38 of the upper and lower load cell assemblies 40. The load cell assemblies each have fixed reaction elements 42 which are rigidly secured to the carriage particularly to the transverse cross-members 46 of the carriage. The respective load cells employed herein are of a type designated as the Revere 2-component load cell (per Revere drawing C-53765) available from Revere Electronics Division, Neptune Meter Company, Wallingford, Connecticut, and have a strain, or spring rate of about 600,000 to 700,000 lbs./inch in the load ranges of 500–1500 lbs. used.

To move the carriage forward and backward, driving means 50 is provided as illustrated in FIGS. 1 and 2. The driving means includes a non-rotating screw 51 attached to the carriage, particularly to the rear cross-member 53, and a worm gear driven nut (not shown) threadedly engaged with the screw and driven by a worm (not shown) coupled to a drive motor 55 which has a conventional internal brake. The worm gear driven nut is contained in a conventional worm gear drive housing 57 which is mounted on a beam 59 securely fixed on slide bars 22 by the clamp blocks 60, the arrangement being such that rotation of the motor causes the carriage 30 to be moved toward or away from the tire. When the carriage is moved to load the tire, the load wheel applies a predetermined base load sufficient to deflect the tire radially an appreciable amount. Inasmuch as the carriage is movable along the bars 22 while such base load is being applied radially to the tire, the base load applied is carried entirely by the drive means to the frame. While the arrangement thus far described is well known and has been satisfactory in most respects, certain disadvantages have been observed which are overcome by the present invention.

In the prior art apparatus, the load wheel, having reached the position in which the base load has been applied to the tire, is subjected to the variations in radial as well as lateral, tangential, or other forces exerted by the tire on the load wheel as the tire and wheel are rotated. These force variations in force variation measuring apparatus heretofore have been applied to and through the driving means to the frame with the result that imperceptible but significant movements of the wheel and carriage occur relative to the tire which cannot be sensed by the load cells. To the extent that such movements of the carriage during force variation measurement are not detected by the load cells, ambiguous results in the force variation measurement can result.

In accordance with the invention, the carriage 30 is secured immediately and directly to the frame 14 so as to prevent movement of the carriage toward and away from the tire 12 and otherwise relatively of the tire and the frame during force variation measuring so that the forces occurring between the tire and the load wheel are carried directly and immediately to the frame and not by way of the driving means to the frame.

Moreover, variations in non-radial forces as well can result in undesirable movements of the carriage relative to the frame, which movements are prevented in accordance with the invention.

Referring now also to FIG. 3, the carriage 30 is secured rigidly to the frame 14 so as to prevent movement of the carriage relative to the frame during force variation measuring by locking or holding means positioned symmetrically with respect to the plane of the two axes 20 and 37. In the apparatus 10, there are two such holding means each of which is operable independently of the driving means 50 and each includes: a first member in the form of an elastically expandable metallic sleeve 65 held securely from movement endwise of its own length by a pair of rigid end blocks 67 fixed relative to the frame 14 and a second member in the form of a cylindrical bar 69 which is fixed rigidly on the carriage 30 and extends through the sleeve 65 parallel to the direction of movement of the carriage 30 along the slide bars 22.

Control means for actuating the sleeve 65 to engaged the bar 69 to prevent relative movement between the bar and the sleeve as well as for releasing the sleeve from such motion-preventing-engagement comprises a passage 71 communicating, by way of a pipe 73, with a hydraulic pressure supply 75 which is controllable selectively, by the valve means 77, to introduce pressurized oil between the sleeve and the bar, and to release the oil therefrom. The sleeve 65 is expanded elastically by such introduction of oil pressure so as to permit relative movement between the bar 69 and the sleeve 65 thus permitting the carriage to move freely along its path. When the hydraulic pressure is released, the sleeve 65 contracts elastically to grip the bar 69 sufficiently to prevent any relative motion therebetween, when loaded within the normal load range of the force variation apparatus 10. The internal diameter of the sleeve 65 is sufficiently smaller than the outside diameter of the bar 69 that a strong interference fit between the sleeve and bar is created, in the absence of the expansive force of the oil pressure, which prevents any movement of the sleeve relative to the bar, or of the bar relative to the sleeve. The carriage 30 to which the bar 69 is fixed is thereby secured to the frame so as to isolate the driving means previously described from any influence thereon by the force variations being exerted between the tire and the load wheel.

A device comprising an expandable sleeve and the rigid end blocks as herein described is available commercially from AMF York, division of American Machine and Foundry Co., York, Pennsylvania, under the name "Bear-Loc."

The hydraulic pressure pipe 73 can be connected to any suitable source of hydraulic pressure, preferably oil, through the control valve means 77 by which the oil can be admitted to or released from the holding means.

Further, one of a second pair of locking or holding means in accordance with the invention is illustrated in FIG. 4. As will become apparent, the holding means as illustrated in FIG. 4 can be used not only as an alternative to the holding means shown in and described with reference to FIG. 3, but as well in combination therewith to provide additional advantages in accomplishing the aims and objects of the invention.

As shown in FIG. 4, the first member of locking or holding means is here provided by the clamp wedges 80 carried slidably in the block 82 which is attached rigidly to the carriage 30. A cylindrical bore 84 extending through the block 82 slidably accommodates the associated slide bar 22 of the apparatus 10 to permit movement of the carriage 30 along its path while the first member 80 is disengaged from the second member which is provided by the slide bar 22 itself. The clamp wedge 80 is fitted slidably in the guideway 86 which extends through the block 82 transversely to and intercepting the bore 84 so that the clamp wedge 80 can be moved into wedging, locking and holding engagement with the second member which herein is the slide bar 22. Engagement of the clamp wedge 80 with the bar 22 not only serves to isolate the drive means 50 from any effect of radial force variations applied to the carriage but in addition locks and holds the carriage rigidly to the frame so as to prevent relative movement between the carriage and the frame in response to other or nonradial force variations such as the lateral and/or tangential force variations exerted by the tire on the load wheel.

Means for controlling selectively the engagement and disengagement of the members 80 and 22 are provided by the fluid pressure cylinder 88 fixed on the slide block 82. The piston 90 of the cylinder is connected to the wedge 80 so that application of fluid pressure, preferably air, to the lower, or rod end, port 88a of the cylinder moves the wedge into locking engagement with the slide bar and application of pressure to the upper, or head end, port 88b of the cylinder moves the wedge away from the slide bar. When the wedge 86 is urged into locking engagement with the slide bar 22, the carriage 30 is fixedly secured to the frame 14 so as to prevent movement of the carriage in directions normal to the bars 22 as well as to isolate the driving means 50 from any influence of the force variations being measured.

While the locking holding means herein described in connection with FIGS. 3 and 4 are preferred, particularly in use together as shown in FIGS. 1 and 2, it can now be observed that such locking holding means can be otherwise applied to serve equally well the purposes of the invention. For example, the first members, of locking holding means, exemplified by the elastically expandable metal sleeve 65 can be secured to the carriage 30 with the sleeve surrounding the slide bar 22 at the positions occupied in FIGS. 1 and 2 by the pair of slide bearings 34a or by the pair of slide bearings 34b. It will likewise now be apparent that the embodiment illustrated in FIG. 4 could be located in the position shown in FIG. 1 occupied by the holding means described in connection with FIG. 3. Other alternative constructions will now also readily suggest themselves to persons skilled in the art upon appreciation of the significance of the object of, insofar as possible, carrying the reaction forces directly from the load wheel 32 and carriage to the machine frame 14 independently of and apart from the driving means 50.

While certain representative embodiments and details have been shown for the purpose of illustrating the invention, it will be apparent to those skilled in the art that various changes and modifications may be made therein without departing from the spirit or scope of the invention.

What is claimed is:

1. In an apparatus for measuring force variations of a tire, which apparatus includes means for mounting a tire for rotation about a first axis fixed relative to said frame, a load wheel carriage, means mounting said carriage on said frame for movement along a fixed path toward and away from said first axis, a load wheel, means rotatably mounting said load wheel on said carriage for rotation about an axis parallel to said first axis, and drive means for moving said carriage toward and away from said first axis;

the improvement comprising carriage locking holding means independent of said drive means and including a first member rigidly fixed relative to said frame and a second member rigidly secured to said carriage, the first and second members being engageable to prevent relative movement therebetween, said first and second members being disengageable to permit relative movement therebetween in a direction parallel to said fixed path, and control means for controlling selectively the engagement and disengagement of said first and second members.

2. Apparatus as claimed in claim 1, wherein said first member is an elastically expandable metal sleeve and said second element is a bar about which said sleeve is arranged, said bar extending parallel to said fixed path, said sleeve having in its unexpanded condition an inner diameter substantially less than the outer diameter of said bar, and means for introducing between said sleeve and bar a pressurized fluid to expand said sleeve to permit relative movement between said sleeve and bar.

3. Apparatus as claimed in claim 1, wherein said second member is a bar extending parallel to said fixed path, said first member including a rigid element movable transversely to said bar and into and out of locking engagement therewith, said control means including means connected to said first member for moving the same into and out of locking engagement with said bar.

4. Apparatus as claimed in claim 3, said first member comprising a rigid element having a bore therethrough slidably receiving said bar.

5. Apparatus as claimed in claim 1, said first member includes a slide bar forming at least a portion of said means mounting said carriage for movement along said fixed path.

6. Apparatus as claimed in claim 5, comprising two pairs of said locking holding means the first of said pairs each comprising a cylindrical bar fixed on said carriage and an elastically expandable sleeve mounted on said frame and cooperable to isolate said drive means from effects of radial force variations between said tire and said load wheel, the second of said pairs each comprising said slide bar and a clamp wedge operable to engage said slide bar to prevent relative movement between said carriage and said slide bar from effects of non-radial force variations between said tire and said load wheel.

* * * * *